(No Model.) 3 Sheets—Sheet 1.
J. J. LEFEBER.
COW MILKING MACHINE.
No. 417,050. Patented Dec. 10, 1889.
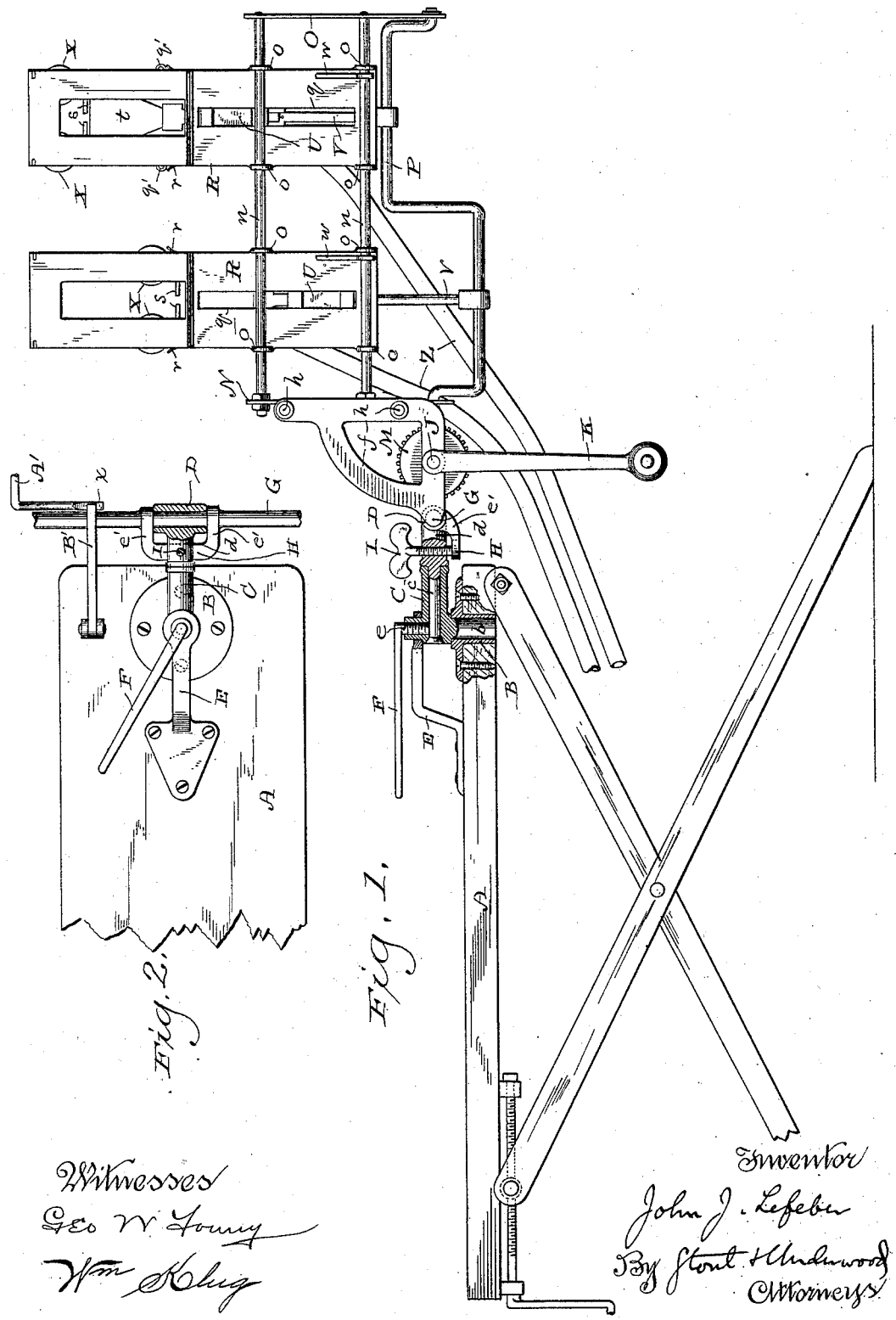
Witnesses
Geo. W. Young
Wm. Klug
Inventor
John J. Lefeber
By Stout & Underwood
Attorneys

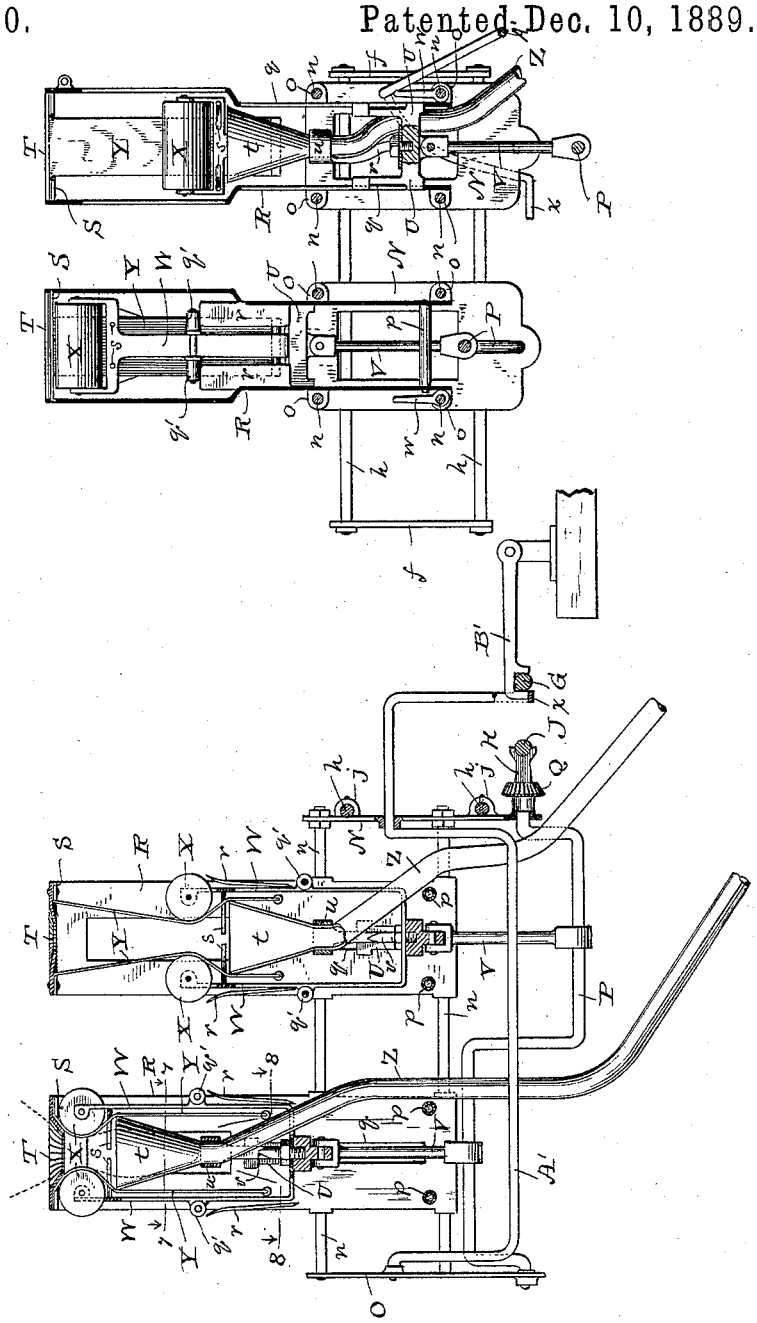

(No Model.) 3 Sheets—Sheet 3.

J. J. LEFEBER.
COW MILKING MACHINE.

No. 417,050. Patented Dec. 10, 1889.

Witnesses
Geo. M. Young
Wm Klug

Inventor
John J. Lefebe
By Stout & Underwood
Attorneys

UNITED STATES PATENT OFFICE.

JOHN J. LEFEBER, OF CALVARY, WISCONSIN.

COW-MILKING MACHINE.

SPECIFICATION forming part of Letters Patent No. 417,050, dated December 10, 1889.

Application filed September 4, 1889. Serial No. 322,952. (No model.)

*To all whom it may concern:*

Be it known that I, JOHN J. LEFEBER, of Calvary, in the county of Fond du Lac, and in the State of Wisconsin, have invented certain new and useful Improvements in Cow-Milking Machines; and I do hereby declare that the following is a full, clear, and exact description thereof.

My invention relates to cow-milking machines, being designed as an improvement on the one set forth in my patent, No. 396,577, issued January 22, 1889; and it consists in certain peculiarities of construction and combination of parts, to be hereinafter described with reference to the accompanying drawings and subsequently claimed.

Figure 6:
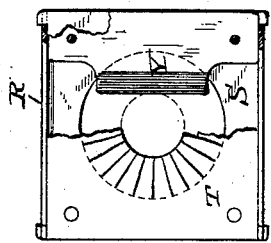
Figure 7:
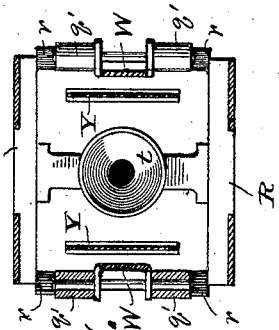
Figure 8:
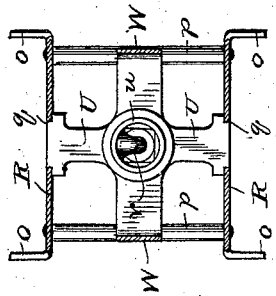
Figure 9:
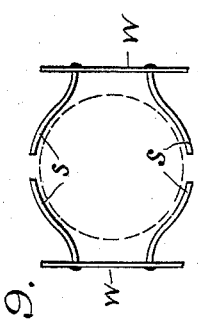
Figure 5:
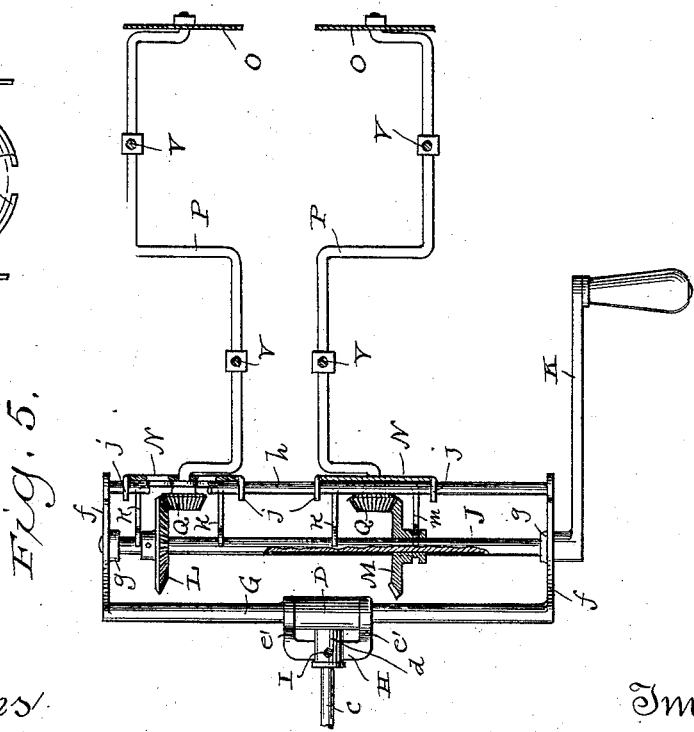

In the drawings, Figure 1 represents a side elevation of my machine with parts broken away; Fig. 2, a detail plan view with parts broken away, and illustrates the means for adjusting the milking apparatus, the guard-rail, and latch; Fig. 3, a detail elevation, partly in section and partly broken away, to illustrate that portion of the milking apparatus farthest from the drive side of the machine; Fig. 4, a front elevation of the milking apparatus, partly in section; Fig. 5, a detail plan view of the driving mechanism; Fig. 6, a detail plan view of a portion of the milking apparatus with parts broken away; Fig. 7, a horizontal section on line 7 7, Fig. 3; Fig. 8, a similar view on line 8 8, same figure; and Fig. 9, a plan view illustrating a pair of teat-guides that form part of the milking apparatus.

Referring by letter to the drawings, A represents a vertically-adjustable base similar to the one set forth in my former patent. The front end of the base is centrally provided with a socket B for the vertical cross-head or pivot $b$ of a sleeve C, and this sleeve engages the reduced and upset end $c$ of a stem $d$ on a sleeve D, the latter sleeve being at right angles to the one C. An angular brace E engages the cross-head $b$ of the sleeve C, and said head is tapped to engage a screw $e$ on an end of a lever F, whereby the stem $d$ may be locked to hold the sleeve D in any position to which the latter may be pivotally adjusted.

Passed through the sleeve D is a transverse rod G, and rigidly connected to this rod adjacent to the ends of said sleeve are ears $e'$ on a plate H, the latter being arranged to extend rearward under the sleeve-stem $d$ and impinge against a screw I, that has its bearing in said sleeve-stem. By the construction above described I form a universal joint between the base A and the milking apparatus, to be hereinafter set forth, this feature of my invention being an important one, as it enables me to adjust said milking apparatus to any desirable angle with relation to the udder and teats of a cow.

The ends of the rod G are provided with right-angle brackets $f$, and the horizontal portions of these brackets have bearings $g$ for a transverse shaft J, that is actuated by a crank K and provided with beveled gear-wheels L M, the latter one of these gear-wheels being splined on said shaft, as illustrated in Fig. 5. The vertical portions of the brackets $f$ are united by braces $h$, that pass through eyes $j$ on vertical plates N, these plates being provided with rearwardly-extended forks $k$, that engage the shaft J, the plate nearest the drive side of the machine being also provided with a spanner $m$ for engagement with the hub of the gear-wheel M, whereby the latter is moved back and forth on said shaft to correspond with a lateral adjustment of this particular plate. Longitudinal rods $n$ connect the vertical plates N with similar plates O, and all these plates are provided with bearings for crank-shafts P, that carry pinions Q for engagement with the gear-wheels L M, as fully illustrated in Fig. 5.

Loosely connected to the rods $n$ by means of lateral eyes $o$ are slotted plates R, united in pairs by means of braces $p$ and top plates S, the latter being provided with central openings of considerable diameter and covered with flexible sheets T, also provided with central openings of less diameter than those in said top plates, while at the same time these flexible sheets are slitted radially from their central openings, for the purpose to be hereinafter described. The slots $q$ in the plates R engage cross-heads U, connected by longitudinally-adjustable pitmen V with the crank-shafts P, whereby a vertical reciprocative motion is imparted to said cross-heads when the crank K is actuated.

Fast to the cross-heads U are spring-plates W, arranged in pairs, the free upper ends of these spring-plates being bifurcated and provided with bearings for elastic pressure-rollers X, arranged to impinge against weighted aprons Y, that extend down through the top plates S, above described, these weighted aprons serving as a means to prevent the pressure-rollers from drawing down the teats of a cow being milked by the machine.

Like in my former patent, the spring-plates W are provided with anti-friction rollers $q'$, that travel on cam-tracks $r$, the latter extended in from the slotted plates R, and by this construction said spring-plates are actuated to bring the elastic pressure-rollers X in and out of contact with the teats of a cow, these teats being passed through the openings in the radially-slitted flexible sheets T and top plates S, said sheets serving as a means to form close connections with varying sizes of teats. The spring-plates W also carry curved fingers $s$, that serve as guides to center the teats over the cup-shaped ends $t$ of tubes Z, the latter being passed down through eyes $u$ on stems $v$, secured to the cross-heads U, to discharge into a suitable receptacle.

Each pair of the slotted plates R is longitudinally adjustable on the rods $n$, and held in the adjusted position by means of cam-latches $w$ on said rods.

Arranged in bearings in the plates N farthest from the drive side of the machine is a cranked guard-rail A', provided with an extension $x$, arranged to come under and against a latch B', pivoted to the base A and normally engaging the rod G, whereby in case a cow being milked should start to move away the guard-rail will be turned in its bearings to raise the latch, and thus permit the milking apparatus to swing around out of the way, the head $b$ of the socket C being the pivot for the movement just described.

The general operation of the machine is not materially different from that described in my former patent, and will be readily understood from the foregoing description.

Having thus described my invention, what I claim as new, and desire to secure by Letters Patent, is—

1. In a cow-milking machine, the combination of a supporting-base having the forward end thereof provided with a socket, a longitudinal sleeve having a cross-head engaged by the socket, a stem engaging the sleeve, a set-screw having its bearing in the cross-head to impinge against the stem, a transverse sleeve on said stem, a milking apparatus having a rod engaged by the latter sleeve, a set-screw having its bearing in the sleeve-stem, and a plate rigidly connected to said rod to extend under and against the latter set-screw, substantially as set forth.

2. In a cow-milking machine, the combination of a supporting-base, a transverse bearing connected thereto, a rod arranged in the bearing, a milking apparatus connected to the rod, a latch pivoted to the supporting-base to normally engage said rod, and a cranked guard-rail arranged in bearings on the milking apparatus to extend under the latch, substantially as set forth.

3. In a cow-milking machine, the combination of slotted plates arranged in pairs, cross-heads engaging the slots in the plates, opposing spring-plates connected to the cross-heads and carrying pressure-rollers, cam-tracks on the slotted plates, anti-friction rollers carried by the spring-plates to travel on the cam-tracks, and a driving mechanism for actuating said cross-heads, substantially as set forth.

4. In a cow-milking machine, the combination of reciprocating cross-heads, opposing spring-plates and tube-supports connected to the cross-heads, pressure-rollers and anti-friction rollers carried by the spring-plates, cam-tracks arranged in the path of the anti-friction rollers, and a driving mechanism for said cross-heads, substantially as set forth.

5. In a cow-milking machine, the combination of reciprocating cross-heads, opposing spring-plates connected to the cross-heads, pressure-rollers, anti-friction rollers, and teat-guides carried by the spring-plates, cam-tracks arranged in the path of the anti-friction rollers, and a driving mechanism for said cross-heads, substantially as set forth.

6. In a cow-milking machine, the combination of vertically-reciprocating pressure-rollers arranged in pairs and aprons arranged between each pair of said rollers, substantially as set forth.

7. In a cow-milking machine, the combination of vertically-reciprocating pressure-rollers arranged in pairs and a flexible sheet arranged above each pair of rollers and radially slitted from an opening therein, substantially as set forth.

8. In a cow-milking machine, the combination of vertically-reciprocating pressure-rollers arranged in pairs, stationary plates arranged above the rollers and provided with openings, and flexible sheets secured to the plates and radially slitted from openings having a less diameter than those in said plates, substantially as set forth.

9. In a cow-milking machine, the combination of vertically-reciprocating pressure-rollers arranged in pairs, stationary plates arranged above the rollers and provided with central openings, flexible sheets secured to the plates and radially slitted from openings having a less diameter than those in said plates, and aprons extended through the plate-openings between each pair of said rollers, substantially as set forth.

10. In a cow-milking machine, the combination of longitudinal rods, plates adjustable on the rods and united in pairs, cam-latches for locking each pair of plates in their adjusted position, and vertically-reciprocating pressure-rollers arranged between each pair of plates, substantially as set forth.

In testimony that I claim the foregoing I have hereunto set my hand, at Calvary, in the county of Fond du Lac and State of Wisconsin, in the presence of two witnesses.

JOHN J. LEFEBER.

Witnesses:
  Z. E. BORST,
  FRANK BEAU.